United States Patent [19]

Fitzpatrick et al.

[11] Patent Number: 5,058,676
[45] Date of Patent: * Oct. 22, 1991

[54] METHOD FOR SETTING WELL CASING USING A RESIN COATED PARTICULATE

[75] Inventors: Harvey J. Fitzpatrick, Lafayette, La.; Jimmie D. Weaver; J. Michael Wilson, both of Duncan, Okla.

[73] Assignee: Halliburton Company, Duncan, Okla.

[*] Notice: The portion of the term of this patent subsequent to Apr. 17, 2007 has been disclaimed.

[21] Appl. No.: 429,748

[22] Filed: Oct. 30, 1989

[51] Int. Cl.$^5$ ................. E21B 43/04; E21B 43/11; E21B 43/26

[52] U.S. Cl. ................. 166/278; 166/295; 166/308

[58] Field of Search ................. 166/308, 278, 295

[56] References Cited

U.S. PATENT DOCUMENTS

| | | |
|---|---|---|
| 2,310,397 | 2/1943 | Coberly . |
| 2,896,714 | 7/1959 | Killingsworth . |
| 2,941,594 | 6/1960 | Ladd et al. . |
| 3,119,448 | 1/1964 | Rhoades . |
| 3,327,783 | 6/1967 | Ayers . |
| 3,353,599 | 11/1967 | Swift . |
| 3,393,736 | 7/1968 | Goodwin . |
| 3,434,540 | 3/1969 | Stein . |
| 3,621,915 | 11/1971 | Bruist et al. . |
| 3,670,817 | 6/1972 | Saucier . |
| 3,692,114 | 10/1972 | Murphy, Jr. et al. . |
| 3,696,867 | 10/1972 | Waid . |
| 3,709,298 | 1/1973 | Pramann . |
| 3,776,311 | 12/1973 | Carnes et al. . |
| 3,796,883 | 3/1974 | Smith et al. . |
| 3,867,986 | 2/1975 | Copeland . |
| 4,018,282 | 4/1977 | Graham et al. . |
| 4,042,032 | 8/1977 | Anderson et al. . |
| 4,046,198 | 9/1977 | Gruesbeck et al. . |
| 4,070,865 | 1/1978 | McLaughlin . |
| 4,074,760 | 2/1978 | Copeland et al. . |
| 4,081,030 | 3/1978 | Carpenter et al. . |
| 4,120,359 | 10/1978 | Harnsberger . |
| 4,200,539 | 4/1980 | Burnham et al. ............ 166/308 X |
| 4,316,810 | 2/1982 | Burnham ............ 166/308 X |
| 4,428,426 | 1/1984 | Davies et al. . |
| 4,589,490 | 5/1986 | Darr et al. . |
| 4,622,155 | 11/1986 | Harris et al. ............ 166/308 X |
| 4,649,998 | 3/1987 | Friedman . |
| 4,685,519 | 8/1987 | Stowe et al. ............ 166/228 |
| 4,829,100 | 5/1989 | Murphey et al. . |
| 4,917,188 | 4/1990 | Fitzpatrick, Jr. ............ 166/295 |

OTHER PUBLICATIONS

SPE 13649... "Resin-Coated Sand Slurries For Repair of Damages Liners" J. R. Murhpey, D. L. Roll and L. Wong.

Primary Examiner—William P. Neuder
Attorney, Agent, or Firm—Thomas R. Weaver; Robert A. Kent

[57] ABSTRACT

An improved method for completing wells formed in both consolidated and unconsolidated formations is disclosed. Further, methods are disclosed for completing deviated wells formed in consolidated formations which require stimulation by hydraulic fracturing. The present invention specifically relates to more efficient, less expensive techniques for well completion comprising novel techniques for the utilization of permeably consolidatably, resin coated particulates.

19 Claims, 5 Drawing Sheets

METHOD FOR SETTING WELL CASING USING A RESIN COATED PARTICULATE

BACKGROUND OF THE INVENTION

1. Field Of The Invention

The present invention generally relates to improved methods for completing wells formed in both consolidated and unconsolidated formations and for completing deviated or horizontal wells formed in consolidated formations which require stimulation by hydraulic fracturing or unconsolidated formations. More particularly, the present invention relates to more efficient and less expensive methods for well completion in underground reservoir rock formations comprising novel techniques for the utilization of permeably consolidatable, resin coated packing materials.

2. Description Of The Prior Art

Increased emphasis is being placed on proper initial well completion as the value of nonrenewable natural resources increases and the costs associated with their production escalate. While such emphasis is especially felt in the areas of hydrocarbon extraction, production of other valuable liquids, such as groundwater, also emphasizes the need for low cost, efficient production techniques. Maximum reliability and productivity of any production program is essential, particularly offshore and in remote locations.

The general sequence of performing a cased hole completion includes drilling the hole, setting and cementing casing in place, perforating the casing for production; cleaning the perforations of damage and debris by flowing back, washing the perforations using a perforation wash tool, surging or perforating underbalanced and stimulating the formation to decrease the skin factor as needed to make the well economically attractive. If the formation requires sand control, this is an additional step which must be performed in addition to the above.

The typical cased hole completion sequence further contains some or all of the following elements. The borehole is drilled with mud whereby the well fluid leaves a region of impaired or damaged permeability adjacent to the borehole. Casing is next run and cemented in place using a Portland cement slurry. Use of such a cement slurry may cause further damage to the formation's native permeability adjacent to the wellbore. However, the Portland cement functions to mechanically support the casing and also to isolate individual permeable formations from each other. At this point, the drilling mud is exchanged with a clear, solids free, completion fluid to reduce the probability of severe damage to the formation permeability during the critical completion phases where the formation is not protected from incompatible fluid invasion by the protective filter cake of mud solids. The casing is next perforated and a method of cleaning the crushed formation and perforating debris is used to clean and open the perforations. The perforation cleaning step may consist of washing the perforations using a perforation wash tool, backsurging the perforations or underbalanced perforating. The latter method is now considered by most operators to be the most effective. Finally, the appropriate hardware can be positioned in the wellbore for either a resin coated sand consolidation, a gravel pack or a conventional completion without any sand control.

The general sequence of performing an open hole completion includes drilling a pilot hole through all formations down to the top of the deepest target formation; setting and cementing casing in place; drilling a pilot hole through the deepest target formation; opening the hole size of the formations to be completed using an underreamer to remove damage from prior operations and stimulating the formation to decrease the skin factor, if needed, to make the well economical. Again, sand control measures are performed in addition to these steps.

The typical open hole completion further comprises the following elements. The final borehole through the interval to be completed is preferably drilled with a nondamaging drilling mud. Casing is then set above the productive interval. If the interval to be completed has not already been drilled though, a pilot hole is drilled through the interval or intervals to be completed. If the pilot hole is drilled with a damaging drill mud, then the hole must be underreamed through the completion internal to remove as much as possible of the damaged formation adjacent to the wellbore. This operation is normally performed with a underreamer rotated on a workstring of pipe and using a nondamaging circulating fluid to carry cuttings to the surface. Once the desired sections of formation are exposed, they may be isolated from each other using inflatable cement packers or, alternatively, the isolated sections of hole may be cemented using formation packers and port collars. If sand control is required, normally a gravel slurry is placed between a slotted liner or wire wrapped screen and the exposed formation, again using ported collars and a combination tool. The combination tool functions to open and close the port collar and also isolates the port collar to direct the slurry placement. After each exposed formation treatment is accomplished, the well is ready to produce.

The production rate possible from the above described completion techniques may be enhanced by stimulating the well. Well stimulation may consist of a chemical stimulation using some kind of acid or solvent solution to dissolve or remove material from the formation. Alternatively, the well may be stimulated by hydraulic fracturing. In hydraulic fracturing, a fracture is created in the reservoir rock by hydraulic forces and then propped open by a particulate material. This propped fracture provides a low resistance flow channel from deep within the formation to the wellbore.

The aforestated general objectives are difficult to obtain where the reservoir rock is unconsolidated or otherwise subject to failure, or where the reservoir requires stimulation to make production or injection economically attractive. Extraction from such formations usually require the utilization of techniques cumulatively referred to as "sand control." Alternatively, such extraction may require hydraulic fracturing, or the combination of the two. The sand control mechanism, however, is exceedingly complex and is influenced by every well operation from first bit penetration throughout the lifetime of production or injection of the well.

Sand problems are most common in younger Tertiary sediments, particularly of the Miocene epoch. Notable examples are extensive, troublesome sand production areas in such sediments in the U.S. Gulf Coast, the Los Angeles basin of California, Canadian tar sands, Indonesia, Nigeria, Trinidad and Venezuela. However, sand inflow also occurs in other formations (i.e., older tertiary) if existing in situ stresses are altered by drilling, completion and production operations such that the rock matrix is weakened, thus allowing movement of sand into the wellbore, casing and tubing.

Factors contributing to the onset and continuance of uncontrolled sand production are numerous. One common basis is alteration of the stresses on the reservoir rock. If the balance of forces on the reservoir rock are sufficiently unbalanced, destruction of the rock matrix generally will follow.

Sand flow from unconsolidated or failure prone consolidated formations is often controlled through chemical or mechanical means to prevent or correct various problems including premature failure of artificial lift equipment; production loss caused by sand bridging in casing, tubing, and/or flow lines; failure of casing or lines; formation damage near the wellbore due to removal of surrounding formation or compaction; and handling and disposal of production formation materials.

A variety of techniques have been developed in the art to address the above noted problems of sand flow. One such method involves the process of injecting chemicals into the naturally unconsolidated formation to provide in situ grain-to-grain cementation. Techniques for accomplishing this successfully are perhaps some of the most sophisticated undertaken in completion work. In closely related methods, sand or other appropriate matrix particulates are treated chemically and then injected into the wellbore (or through the perforations if casing is set) and into the formation where the resulting "pack" consolidates. Production is then commenced through a slotted or perforated liner or casing which is run along the length of the production zone. This technique is commonly referred to as resin coated sand gravel packing, or alternatively, resin coated sand consolidation.

In the consolidated gravel packing art, a particulate, usually a round silica sand of appropriate size and density is coated with a suitable epoxy or plastic resin and placed in a suitable oil or water based carrier to form a viscous slurry. Such a resinous particulate slurry is described, for example, in Copeland, et al., U.S. Pat. No. 4,074,760. This slurry then is injected into the formation through the work string and perforations in the casing to form an area of high mechanical strength and high flow conductivity immediately adjacent the production inlets in the casing. Alternatively, a resin coated particulate may be placed between a wire wrapped screen or slotted liner and the casing.

The above described methods of well completion have a number of disadvantages. Present methods of completing unconsolidated or failure prone consolidated formations using the combination of a hydraulic fracturing method and some type of sand control have not yet addressed the problem of having both fracture entry control and the high perforation density needed for a high efficiency completion. If the fracture stimulation is performed with a limited number of perforations to achieve fracture propagation throughout the entire interval, then the well must be produced at low efficiency through the limited number of perforations. If the interval is re-perforated after the fracture stimulation, several problems arise. First, there is no guarantee that most or all of the second set of perforations will connect to the propped fracture. Therefore, the increased flow capacity of the fracture will be choked back at the wellbore since the fracture will connect to only some of the perforations.

Second, operations employed to clean the second set of perforations by flowthrough or surging may cause loss of proppant from the fracture, resulting in closure of the propped fracture at the critical wellbore juncture. Third, the high flow density at the interface between the fracture and the wellbore represents a potential problem area for both fines movement and plugging, as well as problems arising from deposition of organic deposits. The high flow velocity at the interface causes the fines to migrate and the large pressure drop at this point tends to precipitate out any paraffin or asphaltene deposits where they give the most restriction to production. A further problem with such high velocity fluid movement through the sands involve the possible erosion of the plastic bonds between the particulates. This problem of erosion is particularly acute for zones close to the wellbore and subject to multiphase flow.

Yet another disadvantage of conventional methods of completion utilizing contemporary techniques for sand control involve the time necessitated in securing the casing by cementing along the production zone and in isolating separate reservoirs and further, in the numerous subsequent completion steps required to complete a number of narrow production intervals in such zone. In such cases, cement seals or formation packers must be introduced between each production interval. Then formation damage or debris must be removed from the interface between the virgin, undamaged formation and the wellbore to effect an efficient completion. Ordinarily, this removal must be accomplished prior to placement of sand control measures for each formation interval to be completed. This debris removal is generally accomplished via chemical means, mechanical means or a combination of the two.

Underreaming is generally the preferred mechanical method for damage removal prior to placement of sand control measures in open hole completions. Underreaming, however, is highly time consumptive since it entails the introduciton of the underreaming tool via a work string, hence necessitating at least one "round trip" for each production interval. Furthermore, additional trips may be required if hole stability problems are encountered. Even when the production intervals are grouped in a single zone, such damage removal processes can involve extensive time expenditures. Such time expenditures are especially noteworthy in deeper wells or in deviated wells having a large net length. Additionally, underreaming procedures conducted in some unconsolidated formations and particularly substantially horizontal wells might result in a complete collapse of the borehole and hence abandonment of the well.

Further disadvantages of contemporary completion art involve the inconsistency in the character of the high conductivity region created by the resin coated particulate slurry. Contemporary completion techniques incorporating provisions for sand control describe the introduction of the resin particulate slurry into the wellbore in such a fashion as to cause laminar flow of the slurry in the annulus between the wellbore and the production casing. If the casing is situated off center in the wellbore, the laminar flow of the resin slurry often leaves unfilled voids immediately adjacent the casing which may often decrease production efficiency. Such problems are again particularly acute in deviated wells where undesirable "duning" occurs. Laminar flow of such sands into the annulus also allows time for the formation to dehydrate the resin slurry, also resulting in premature and often unsatisfactory set up of the consolidated formation adjacent the production casing.

SUMMARY OF THE INVENTION

The present invention addresses the aforementioned and other disadvantages by providing improved methods for completing wells in unconsolidated sand and limestone formations. The present invention also provides for the completion of deviated or substantially horizontal wells in consolidated or unconsolidated formations which may require stimulation by hydraulic fracturing.

In a preferred embodiment of the present invention, for use in a consolidated or unconsolidated formation, an open hole resin coated particulate pack is placed around the uncemented production casing across the projected production interval(s). The well is next hydraulically fractured, if required, with a treatment fluid containing a proppant material utilizing, for example, the limited entry perforating technique through the open hole resin coated sand consolidation. The treatment fluid may include a hardenable resin to consolidate the proppant. Substantially any of the well known conventional fracturing techniques may be utilized to create the fractures. At this point a conductive channel or series of channels into the reservoir is realized with minimized restriction close to the wellbore region. In the next phase of the method, the casing may be perforated using a large hole diameter, shallow penetration depth, high shot density perforating gun or by any other conventional perforation method such as hydro-jetting or by electrochemical reaction to remove seals from preformed perforations. Finally, a gravel pack is performed inside the casing using a wire wrapped screen and a gravel packer if additional sand control is necessary.

Before production casing may be set in the wellbore, the wellbore generally is mechanically underreamed or otherwise cleaned in order to remove the mudcake and also to enhance the diameter of the void around the casing. In such a fashion, the resin coated sand or particulate slurry is able to contact uncontaminated areas of the formation while establishing a larger cross sectional area of permeable consolidation. In another preferred embodiment of the invention, the wellbore is underreamed or scoured via an abrasive sand slurry which is rejected down the casing or inner string and into turbulent contact with the formation. The turbulent action of the abrasive slurry simultaneously removes the mudcake from the walls of the wellbore while contouring the wellbore to a desired production diameter. This abrasive slurry may then be displaced in the wellbore by the introduction of a resin coated particulate slurry as above described which is introduced at a pressure so as to result in optimal flow characteristics, e.g. either transition flow or turbulent flow rates which do not impart sufficient stress on the walls of the borehole to cause formation sloughing or undesirable mixing of formation material with the resin coated particulate slurry. This second slurry then is allowed to set around the production casing to form a consolidated zone of high conductivity. The mudcake also may be removed by introduction of a treatment fluid containing suitable chemical dispersants which cause the structure of the mudcake to be disrupted whereby it is removed from the face of the wellbore. In yet another preferred embodiment of the invention for use in an unconsolidated or consolidated formation in which a substantially horizontal well has been drilled, casing is introduced into the well across the desired length of the production interval. The casing then is perforated or various ported tools in the casing string may be utilized to provide openings through which the resin coated particulate is introduced into the open hole surrounding the casing in an amount to substantially fill the void space. If desired, the formation may be fractured at the same time as the resin coated particulate is being placed in the wellbore by injecting a portion of the resin coated particulate into the open hole at a pressure in excess of the pressure required to fracture the formation. The resin coated particulate then would flow into the created fracture and upon setting provide a conductive channel or channels to the wellbore. Alternatively, the casing may be perforated as previously described to provide a plurality of openings and a gravel pack may be performed inside the casing if required to control formation fines or particulate movement.

The present invention has a number of advantages over the prior art. The proposed methods of completion result in a high conductivity region surrounding the wellbore which provides a pathway or channel between the fracture flow and the high density perforations while giving fracture propagation control during any hydraulic fracturing operation. As such, production efficiency is dramatically increased.

A second advantage of the present method is the ability to secure production casing along a potential pay zone without cementing, therefore avoiding undue contamination and formation damage along the production zone so as to necessitate time consuming opening, underreaming operations, or other rigorous methods of debris removal which risk formation damage.

Another advantage of the present invention is the ability to form an annulus of desired diameter without the need to resort to mechanical underreamers or openers. Such ability greatly reduces or eliminates the need to trip mechanical underreamers or the like in the hole. This advantage is particularly significant in deep wells, wells formed in highly unconsolidated formation or in deviated wells which involve an abnormally long net production lengths.

DETAILED DESCRIPTION OF THE PREFERRED EMBODIMENT

Figure 1A:
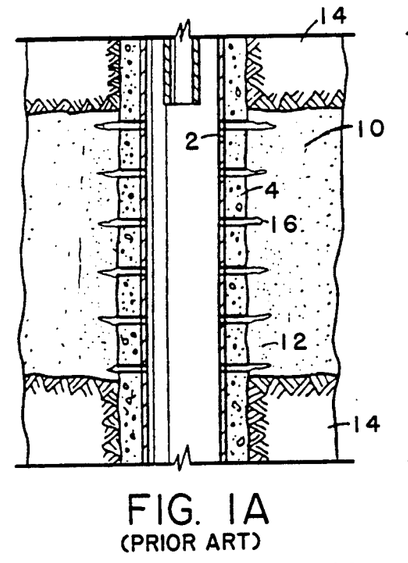
FIG. 1A generally illustrates a side cutaway view of a well formed in an unconsolidated sand formation, in accordance with prior art methods of sand control.
Figure 1B:
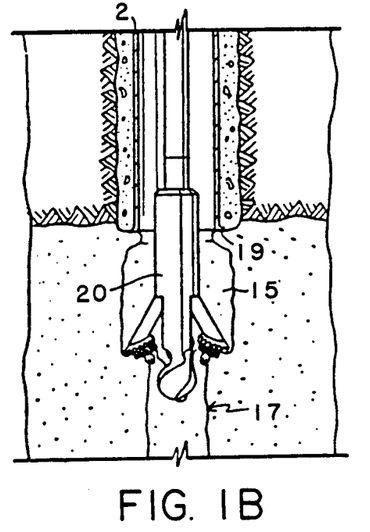
FIG. 1B illustrates a side cutaway view of a mechanical underreaming tool as it may be used to enlarge the diameter of the wellbore through the production zone.

FIG. 1 generally illustrates a side, cross sectional view of a vertical well completed in an unconsolidated formation in accordance with prior art techniques of well completion utilizing either a consolidatable resin coated packing material or a gravel pack. As seen in FIG. 1A, an open hole has been formed in a production zone 10, such as a younger tertiary sand lens, extending between two nonproducing intervals 14. Prepatory to setting casing through this zone 10, the wellbore has been "opened" or "underreamed" with a tool 20 similar to that illustrated in FIG. 1B.

Hole opening devices 20 such as that illustrated in FIG. 1B, feature cutting arms which may be expanded by hydraulic pressure after the tool 20 is first run through casing in order to enlarge the open hole beneath the shoe 19. Hole openers or underreamers 20 are used to enlarge the hole to allow for increased gravel thickness around slotted or screen type liners. Such underreaming operations are also necessary to remove the mudcake from the wall of the wellbore and from the the adjacent damaged region.

Referring to FIG. 1B, when the wellbore has thus been contoured or underreamed to a desired diameter as above described, a gravel pack, normally consisting of a particulate slurry or a resin coated particulate slurry, is injected into the widened annular space 15 formed by the underreamer 20 between the walls of the wellbore 17 and the casing 2 which has been extended into space 15 by insertion of a slotted liner or screen liner. Generally, this viscous slurry is injected into the annular space by pumping from the workstring through a crossover tool into the annulus which then is filled with the particulate, whereupon the well is essentially complete except for installation of tubing and wellhead.

Another open hole type completion in a consolidated formation utilizing a resin coated particulate slurry is the process known as a Puddle Pack TM recompletion process described in U.S. Pat. No. 4,589,490. This type of completion is performed on a well having an open hole interval such as that created by shooting the well with nitroglycerine. With reference to FIG. 1A, The Puddle Pack TM process entails filling the open hole space with a resin coated particulate. When the resin has set a borehole is drilled through the consolidated pack, casing is run and cemented in place across the zone 4 (FIG. 1A). A perforating tool (not shown) is then introduced in the well, forming perforations 16 through the casing 2 and cement 4 into the high conductivity region 12 formed by the resin coated material utilized in the Puddle Pack TM, whereupon the well then may be produced.

The method of the present invention generally facilitates the above-mentioned prior art technique while enhancing the productivity of a given formation. The method of the present invention further results in the realization of substantial economic benefits in deeper wells, as well as in deviated wells and particularly substantially horizontal wells in unconsolidated formations.

Figure 2A:
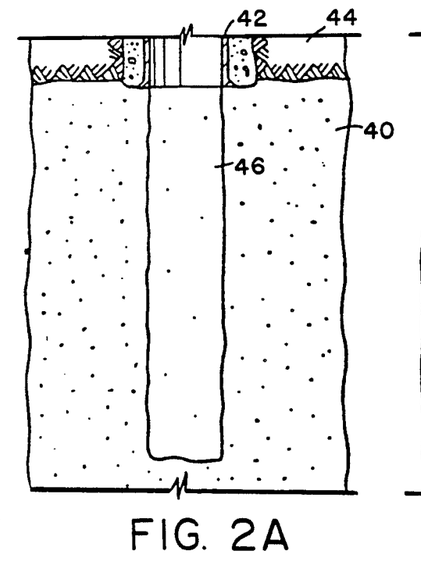
FIGS. 2A-J illustrate a side cutaway view illustrating the method by which the wellbore may be contoured by use of turbulent particulate injection.
Figure 2B:
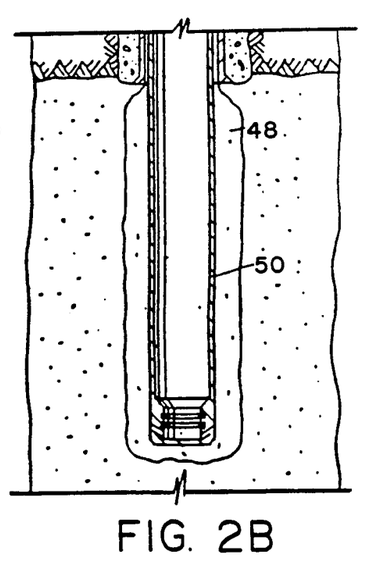
Figure 3A:
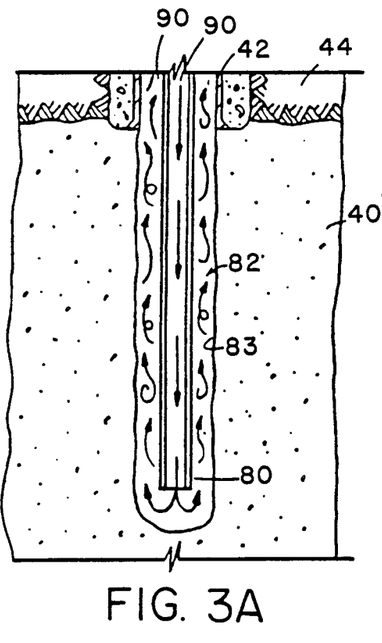
FIGS. 3A-C illustrate a slide cutaway view illustrating the method by which the wellbore may be contoured by use of turbulent particulate injection.
Figure 3B:
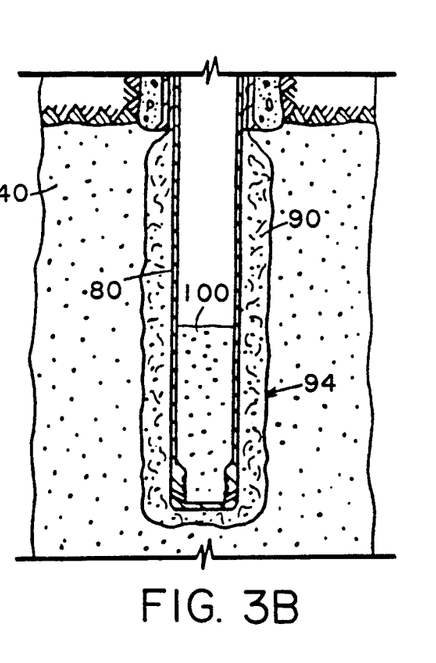
Figure 3C:
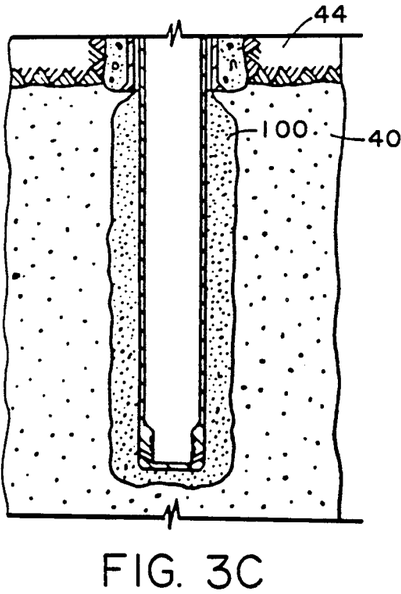

The general method of the present invention can generally be seen by reference to FIGS. 2 and 3 consisting of FIGS. 2A-J and 3A-C, respectively. FIG. 2A illustrates a bore 46 formed in a producing formation 40, which may be consolidated or unconsolidated, vertically adjacent a nonproducing horizon 44 such as a shale or nonpermeable sand. In FIG. 2A, intermediate casing 42 has been set above the zone of interest 40 to the extent of this nonproducing zone 44. In accordance with prior art techniques, the bore 46 then is recontoured or underreamed or otherwise cleaned (FIG. 2B) to remove the mudcake formed along the walls of the wellbore and to establish an annulus 48 of sufficient size to sustain the gravel pack. This recontouring or opening may be accomplished via an underreaming tool as illustrated in FIG. 1B. Alternatively, this underreaming may be accomplished via the introduction of an abrasive sand slurry as will be further discussed herein or by introduction of a suitable treatment fluid containing various dispersants for the mud.

Figure 2C:
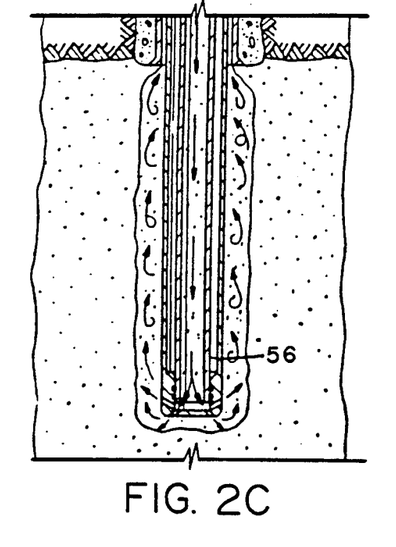
Figure 2D:
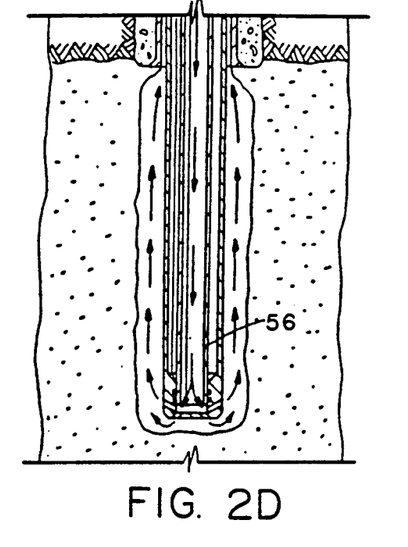

Referring to FIGS. 2B-2D, once the wellbore has been contoured to a desired dimension and the mudcake removed, production casing 50 then is set in the annulus 48. Once the casing is in place, an inner workstring 56 is preferably set in place. (See FIG. 2C & 2D). The well is now prepared to receive the resin coated particulate slurry. In wells where undesired migration of formation sands is expected, a slotted liner or wire wrapped screen (not shown) may be used and a gravel pack performed between the screen and the casing later in the completion sequence.

Figure 2E:
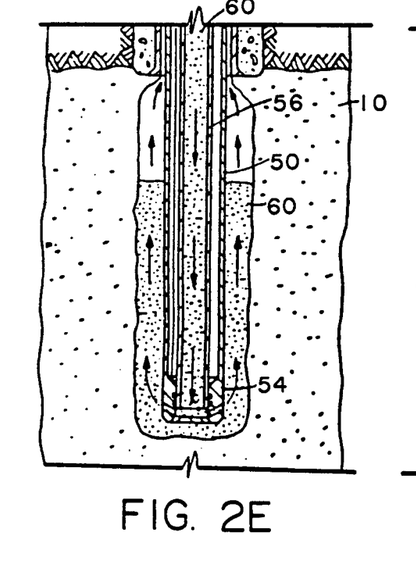
Figure 2F:
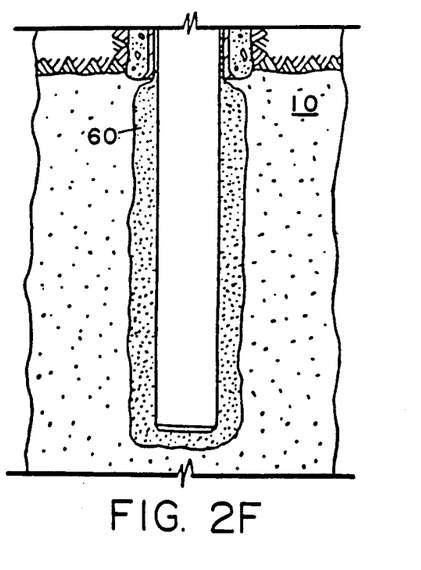

Referring to FIGS. 2E-F, the placement of the resin coated packing material is accomplished by pumping the resin coated slurry 60 down through the workstring 56. The workstring 56 is preferably sealed into a casing shoe 54 or a float shoe if the zone to receive the resin coated particulate material exists at the point of the casing seat. Otherwise, the workstring 56 is sealed to or isolated at an appropriate depth in the casing string. The resin coated slurry then is pumped down the workstring 56 through the casing shoe 54 or a port in the casing string (not shown) and up across the zone of interest 10. Preferably, the resultant high conductivity region 60 is equally consolidated around the production casing 50 so to ensure even production flow.

Figure 2G:
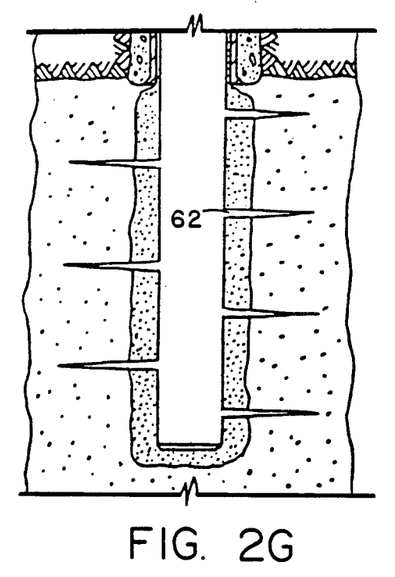
Figure 2H:
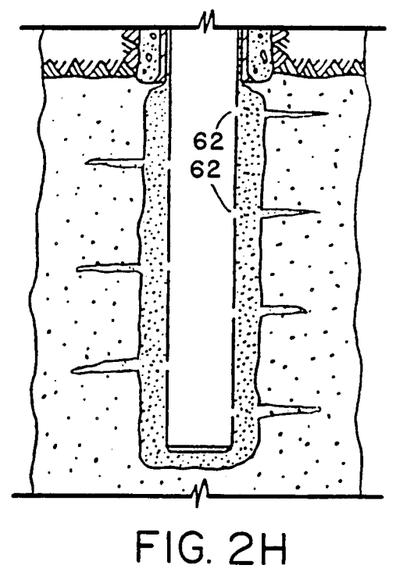

Once the resin coated slurry injected in the annulus has consolidated around the production casing to form a high conductivity region 60, the casing then is perforated (FIG. 2G). Such perforation may be accomplished via a deep penetrating bullet perforation or jet charge type technique or by any other conventionally known method. Once perforated at the desired interval spacing, the formation then is fractured. In a preferred embodiment, formation fracturing is induced by injecting a slurry containing a suitable proppant, such as additional amounts of the resin coated slurry, into the perforations 62 (See 2H).

Figure 2I:
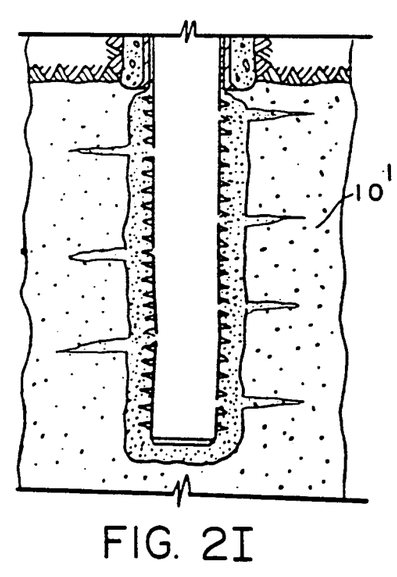
Figure 2J:
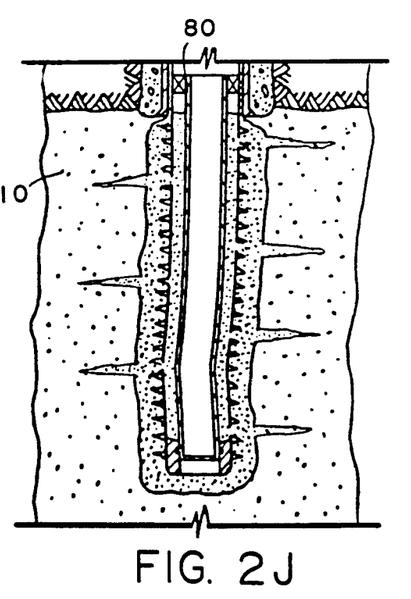
Figure 4:
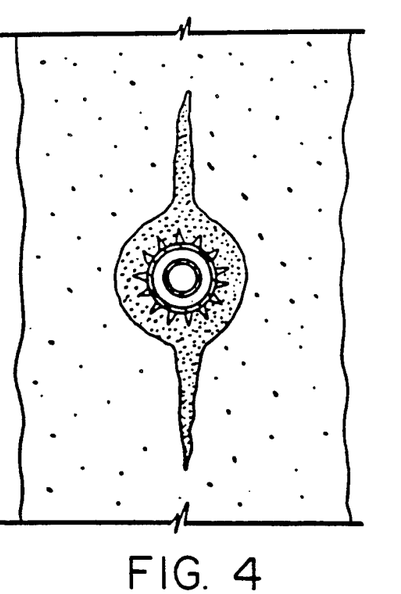
FIG. 4 illustrates a top cross sectional view of the high productivity region surrounding the wellbore produced as a result of the claimed method.

Once fractured, the formation then is re-perforated (FIG. 2I). In preferred embodiments, a large bore, high shot density, shallow penetration, tubing conveyed perforation device is utilized to achieve this re-perforation. Any other conventional perforation technique also may be utilized. Since a highly permeable sheath of resin coated particulates surrounds the casing, the optimal charge design is a maximum bore charge which will penetrate only the casing. Where extensive migration of formation sands through the gravel pack is expected, a slotted or perforated screen 80 may then be introduced inside the production casing. The completed fractured well is illustrated in the horizontal section through the producing zone in FIG. 4.

The consolidatable, resin coated packing material, such as that sold by Halliburton Services, Duncan, Oklahoma under the tradename "Hydrocon-E" slurry, is important to provide a high permeability interface region or "gravel pack" to connect the wellbore to the fracture. Utilized in accordance with the present invention, such "gravel pack" generally provides the following advantages:

(1) structural support for the casing;

(2) consolidated media to support the deep penetrating limited entry charges used for fracturing:

(3) creates a high permeability channel between the proposed fracture and the perforations in the casing which are necessary to minimize drawdown and restriction to flow through a gravel pack. The resin coated packing material provides the connection to allow flow from the fracture to access all the casing perforations;

(4) Expands the effective wellbore radius to enhance and reduce the velocity of fluid flow through the formation pores near the wellbore. The reduced flow velocity will reduce the tendency of fine particles of formation material to migrate in the formation pores and cause plugging of the pores. This facilitates the completion to maintain high productivity with less chance of premature flow impairment due to fines migration.

(5) Eliminates needs for cement across the production zone, thus eliminating cement filtrate damage.

FIGS. 3A-C illustrate yet another preferred embodiment of the invention which addresses the above noted disadvantages of well completion. FIGS. 3A-C generally illustrate a bore 82 formed through a nonproducing zone 44 into an adjacent producing horizon 40. In these figures, intermediate casing 42 has been set in the non-productive zone 44 and cemented in place. From this intermediate casing 42 has been hung production casing or liner 80. This casing 80 is run into the bore 82 which has not been underreamed or opened. Once the casing 80 is fully run on the bore 82, an abrasive slurry 90 is pumped down into the casing at a pressure so as to induce turbulent flow of the abrasive slurry 90 down the bottom of the casing 80 and up between said casing 80 and the wellbore 82. This abrasive slurry 90 strips the mudcake from the wellbore wall while simultaneously recontouring the wellbore 82 to a diameter sufficient to accept the resin coated packing material as will be later described.

Once a sufficient area has been formed in the production zone 40 adjacent the casing 80 such that damage from drilling is substantially eliminated and the bore diameter is sufficiently large to allow laminar flow at the projected producing rate, a resin coated particulate 100 then is injected down into the casing 80 into the resulting annulus 94. This particulate material 100 displaces the abrasive slurry 90 which then is retrieved along with formation debris at the surface. Preferably, the resin coated particulate is injected at a pressure so as to induce sub-erosive flow in the annulus 94. As such, a maximum flow rate is achieved in this material so as to give sufficient displacement of debris by the resin coated particulate 100 while not inducing additional abrasion of the wellbore wall 83.

While it is envisioned that a separate abrasive slurry such as, walnut hulls, blasting sand or the like and a packing material may be used in accordance with the above described embodiment, some occasions may suggest the use of a single slurry, such as, a resin coated particulate which accomplishes the above described result by use of varying injection pressures. Hence, it is envisioned that it may be possible to first inject the resin coated particulate at a pressure so as to induce turbulent flow. Once the wellbore is appropriately contoured, the pump pressure would then be reduced to allow for the injection of the resin coated particulate under non turbulent conditions, preferably sub-erosive flow.

In another preferred embodiment of the invention, a ported section of casing covered by a wire wrapped screen is introduced above the zone of interest so as to facilitate circulation of slurry across a given production interval and to give more complete coverage and packing of the resin coated sand. An upper ported section or multistage cementing tool may be added in combination with formation packers so as to allow the completion of multiple zones utilizing the proposed method. In such an embodiment, the use of multistage cementing tools and formation packers, such as a Lynes ECP open hole gravel pack system, allows isolation of multiple high consolidation zones by placement of cemented sections between the production zones.

The resin coated sand or particulate slurry is preferably introduced through the workstring or casing at a rate and pressure so as to result in sub-erosive flow of the slurry into the annulus around the casing. Sub-erosive flow, or a flow rate greater than laminar flow but less than the flow rate sufficient to cause shear and erosion of the borehole wall, enhances the consolidation of the resin coated packing material by filling in voids created during premature "setting" of the sand pack, or as created by off center placement of the casing in the wellbore.

Figures 5A, 5B:
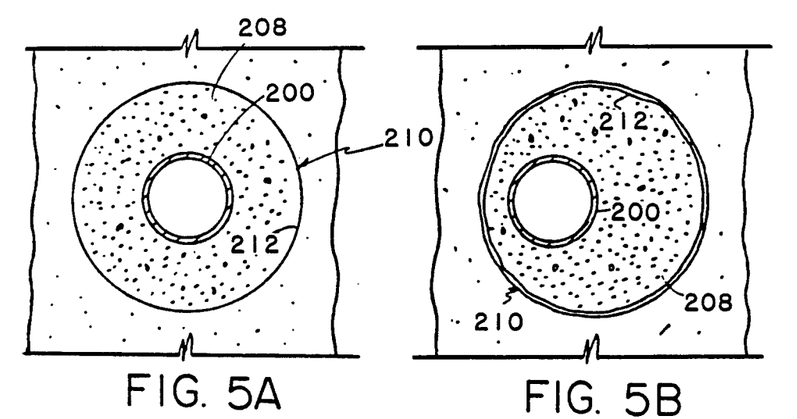
FIGS. 5A-D illustrate a top cross sectional view of casing unsymetrically situated in the wellbore.
Figure 5C:
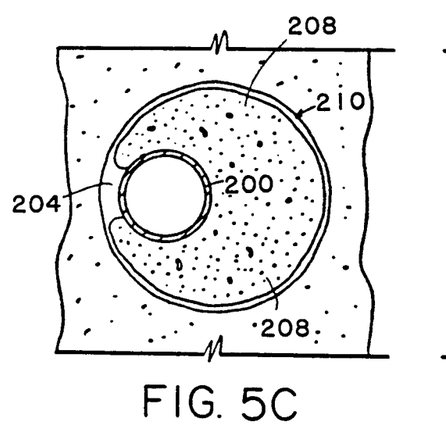
Figure 5D:
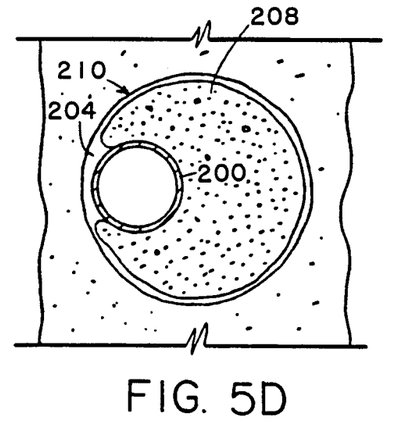

Such off centered conditions are particularly severe in deviated holes. FIGS. 5A-D generally exemplify how a casing symmetrically aligned and seated in the wellbore 210 may begin to experience lateral displacement along its length to a point where it contacts or is near contact with the wall 212 of the wellbore. Referring to FIGS. 5A-B, a casing 200 is initially centered in the wellbore at the shoe (not shown) but at only 48" above the shoe the casing already demonstrates substantial off-center deflection from the wellbore axis. This deflection increases at 72" (5C) and at 120∝1 (5D) above the shoe. Hence, at only ten feet above the casing shoe the centered casing 200 already contacts or nearly contacts the wellbore wall 212. When such deflection exists, resin coated sand slurry introduced into the annulus 208 under laminar flow leaves voids 204 at these areas where the casing 200 is off-center with respect to the wellbore. When the casing is perforated and production commences through the high permeability region 208, these voids 204 dramatically inhibit favorable production by allowing low conductivity formation sand 212 to fill casing perforations.

These problems may be addressed by injecting the slurry at a transition or sub-erosive fluid flow, i.e., greater than laminar flow, since the agitated slurry will be forced into voids 204 created in the annulus 208. In comparison, injection of the slurry as to result in greater than transition flow or turbulent flow is not desired since such turbulent flow might cause undesired sloughing or deterioration of the wellbore wall. Such deterioration in turn would introduce low permeability formation sands into the resulting matrix adjacent the production casing, hence detrimentally affecting production.

Prior to setting production casing through the production zone, the wellbore must often be "underreamed" or "opened" to remove mudcake from the walls of the wellbore. When sand control is implemented, the wellbore will also often have to be underreamed to an additional diameter so as to support the packing material. Such underreaming or opening procedures, while vital to efficient production from the zone, involves the use of mechanical tools which must be run or "tripped" into the hole. Such tripping necessitates the utilization of a derrick rig and involves a time consumptive and hence expensive process. Such is particularly true if a plurality of individual producing horizons must be addressed, each involving an individual underreaming operation. One embodiment of the present invention substantially eliminates the need for this time-consuming procedure. In accordance with the method of the present invention, casing is run across the target zone in the original borehole and hole opening and damage removal is accomplished immediately prior to setting the casing via placement of the resin coated particulate or by chemical preflushes.

The resin utilized in the performance of the present invention may comprise substantially any of the known hardenable resins, such as for example novolak resins epoxy resins, polyester resins, phenol-aldehyde resins, furan resins, urethanes and the like. Examples of suitable compositions are disclosed in for example U.S. Pat. Nos. 4,649,998; 4,074,760; 4,070,865 and 4,042,032, the entire disclosures of which are incorporated herein by reference. The particulate utilized in the performance of the present invention can comprise sand, bauxite, sintered bauxite, ceramic materials, glass beads, foamed ceramics or glass materials containing voids produced by gases or other processes such as hollow mineral glass spheres sold under the tradename "SPHERELITE" by Halliburton Services, Duncan, Oklahoma, nut shells, coke, plastics, teflon beads or any other material which is capable of being coated by the resin and subsequently forming a consolidated body having sufficient permeability to facilitate the flow of hydrocarbons therethrough. In one embodiment of the present invention, when the particulate comprises sand particles, it has been found that the particulate may be present in the resin composition slurry in an amount of in excess of 28 pounds per gallon of liquid. Alternatively, it has been found that the particulate may comprise in excess of 55% by volume of the slurry. Such high particulate content facilitates highly deviated well treatments. The resin coated particulate slurry is prepared in accordance with the well known conventional batch mixing techniques, such as disclosed in the foregoing U.S. patents or the slurry may be prepared in a substantially continuous manner such as the method disclosed in U.S. Pat. No. 4,829,100, the entire disclosure of which is incorporated herein by reference.

In yet another embodiment of the present invention, wherein it is desired to produce hydrocarbons through a substantially horizontal well in an unconsolidated formation, enhanced productivity also can be achieved. The substantially horizontal well or highly deviated well is formed by a bore passing generally vertically through a non-producing zone such as a shale or non-permeable sand adjoining the producing zone and thereafter entering the producing zone in a substantially horizontal direction to the zone. The path of the bore within the producing zone may be from about 100 feet to several thousand feet in length. The techniques utilized in drilling such wells are well known and may be accomplished by any of the conventional techniques.

In one embodiment of the present invention the drilling mud utilized during drilling through the producing zone is of the type referred to by individuals skilled in the art as an "acid soluble mud system." In this instance, after production casing is set in the bore, the open hole is contacted with a suitable acidic fluid to remove or dissolve at least a portion of the mudcake formed along the walls of the wellbore. The acidic fluid is pumped down through the casing or tubing positioned within the casing string and introduced into the annulus between the casing and wellbore wall. The acidic fluid may be pumped at either erosive or sub-erosive rates depending upon how much the annulus is to be enlarged.

In alternate techniques, the mudcake can be removed from the wellbore by underreaming prior to placement of the production casing or by pumping an abrasive slurry as previously described or by utilizing a fluid containing chemical dispersing agents for the mudcake. Once the annulus has been sufficiently cleaned, the method of the present invention may be accomplished.

The placement of the resin coated particulate may be accomplished by pumping the resin coated slurry down through tubing comprising a work string positioned within the production casing and preferably through a casing shoe or float shoe or cementing tool to enter the annulus surrounding the casing. Generally, the resin coated particulate is pumped through the workstring to the farthest point to be treated and then flowed back along the outside of the production casing to fill the annulus within the zone of interest. However, it is to be understood that other methods of introduction also may be utilized. If desired, several tools may be utilized whereby the void outside the casing may be filled in stages or different portions of the bore may be isolated by open hole packers or the like to facilitate subsequent fracturing operations. The resin coated particulate, upon setting, provides a consolidated high conductivity region around the production casing to assist in stabilizing the unconsolidated formation comprising the production zone.

After the resin coated particulate has set, the casing then may be perforated as previously described if additional perforations are desired to provide a plurality of openings into the casing to achieve substantially the equivalent of open hole production from the subterranean formation. Such additional treatment also can include the installation of a slotted liner or screen and performance of a gravel pack within the casing if additional sand control is necessary.

In yet another embodiment of the present invention in which a substantially horizontal or highly deviated well is to be completed in a consolidated formation, enhanced productivity also can be achieved.

After removal of the mudcake by any of the previously described methods, the resin coated particulate is introduced into the annulus surrounding the production casing in the wellbore through, for example, a workstring positioned in the casing. The resin coated particulate is pumped down the workstring through a casing shoe or float shoe or other tool to enter the annulus surrounding the casing. Sufficient resin coated particulate is introduced into the annulus to substantially fill the annulus in the zone of interest. As previously indicated, the introduction process may be accomplished through use of several tools in the casing string which permit different portions of the borehole to be selectively isolated and treated. This is particularly advantageous if it is desired to fracture stimulate the consolidated formation. In this instance, as the resin coated particulate is introduced into a selected region of the wellbore, the injection rate can be increased to a level whereby fracturing of the formation may be achieved by the pressure exerted by the slurry of resin coated particulate. The slurry of resin coated particulate, upon fracturing the formation, then will tend to flow into the created fracture to create a pathway of enhanced conductivity to the wellbore. The entire quantity of resin coated particulate may be introduced in the annulus at a pressure sufficient to fracture the formation or the injection rate may fluctuate during introduction of the slurry into the annulus in the formation to thereby attempt to promote multiple fracture formation and induce bridging of the particulate in the created fractures.

Alternatively, the subterranean formation may be subjected to a fracturing treatment prior to introduction of the resin coated particulate into the wellbore. Such a fracturing treatment may be performed in accordance with substantially any of the conventionally know techniques or methods utilizing aqueous fluids, nonaqueous fluids, foamed fluids or the like and may include the placement of a suitable proppant in the created fractures which may include a resin coating. The subsequently introduced resin coated particulate then will result in the formation of a high conductivity region adjacent the production casing while providing support for the casing in the wellbore.

The foregoing descriptions of selected embodiments the invention shall be construed as illustrative only, and not as a limitation upon the scope of the invention as defined in the claims.

What is claimed is:

1. An improved method for well completion comprising the steps of:
   injecting a consolidatable resin coated particulate slurry through unperforated production casing set in the production zone of a producing formation such that said slurry flows into an annulus formed between the casing and the wellbore to form a zone of high conductivity substantially surrounding said casing and communicating with said casing and said formation and concurrently with such injection creating at least one fracture in said formation with said slurry;
   said formation with said slurry; permitting said consolidatable resin to harden; and perforating the casing and consolidated zone.

2. The method as set forth in claim 1 wherein the resin coated particulate slurry is injected into the annulus such that said slurry undergoes sub-erosive flow.

3. The method as set forth in claim 1 wherein the annulus is formed by the turbulent injection of an abrasive slurry.

4. The method as set forth in claim 1 wherein the production casing is bonded next to said producing zone by the consolidation of said resin coated particulate slurry.

5. The method of claim 1 further defined to include the step wherein a slotted liner or wire wrapped screen is introduced into the casing across the production zone and a gravel pack is then performed between the slotted liner or screen and the casing.

6. A method for completing a deviated well, comprising the steps of:
   injecting an abrasive slurry through unperforated casing set in a producing formation at such a rate that the slurry undergoes turbulent flow between the casing and the walls of the wellbore, such as to form an annulus therebetween;
   injecting a resin coated particulate slurry through said casing at such a rate that the slurry undergoes sub-erosive flow into the annulus to substantially surround said casing;
   allowing said resin coated slurry to set and bond the casing in place so as to form a zone of high conductivity adjacent said casing; and
   perforating the production casing and the high conductivity consolidated zone adjacent said casing to complete said well.

7. The method of claim 6 wherein the formation is fractured hydraulically through the pressurized introduction of a resin particulate slurry into the annulus.

8. The method of claim 6 wherein the casing and consolidated zone is perforated using a limited entry perforation technique.

9. The method of claim 6 including the additional step wherein the well is produced through a gravel packed liner placed inside said production casing.

10. A method of completing a well formed in a subterranean production zone, comprising the steps of:
    injecting a resin coated particulate slurry through unperforated casing set in or adjacent to said production zone at a pressure such that said slurry exhibits sub-erosive flow into the annulus formed between said casing and said production zone whereby said slurry substantially surround said casing;
    allowing said slurry to set in and around said casing in said annulus so as to fix said casing in said production zone;
    perforating said casing in said production zone at widely spaced intervals;
    fracturing said production zone by injecting a fluid including a consolidatable slurry into said perforations; and
    reperforating said production zone to produce additional perforations in said casing.

11. The method of claim 10 where the well is deviated in a consolidated formation which requires stimulation by hydraulic fracturing.

12. The method of claim 10 wherein the particulates are comprised substantially of sand.

13. The method of claim 10 further including the steps of: injecting an abrasive slurry through the casing prior to injecting resin coated particulate slurry and said injection being made at a pressure and for a duration sufficient to form an annulus between said casing and said production zone.

14. The method of claim 13 wherein the pressure at which the abrasive slurry is injected through the casing is such as to cause said abrasive slurry to undergo turbulent flow.

15. A method of completing a well formed in an unconsolidated subterranean production zone, comprising the steps of:
    setting a liner of unperforated production casing in the well opposite the production zone;
    injecting a first fluid through said liner and into the annulus between the liner and the wall of the well at such a rate that the first fluid removes undesired debris and mudcake from the wall of the well;
    injecting a slurry of permeably consolidatable, resin-coated, particulate through the liner and into the annulus at such a rate that the slurry forms a pack substantially surrounding said liner in the annulus and undergoes transition flow through the annulus so as to not cause failure or sloughing of the wall of the well;
    consolidating the pack of the resin coated particulate within the annulus to pack off the production zone; and perforating the liner.

16. The method of claim 15 wherein said first fluid comprises an acidic solution capable or removing the mudcake by dissolution.

17. The method of claim 15 wherein said first fluid comprises an abrasive slurry of a particulate material.

18. The method of claim 15 wherein said first fluid comprises an abrasive slurry comprising resin coated particulate.

19. The method of claim 15 wherein said first fluid comprises a solution of a chemical dispersant for the mudcake.

* * * * *